Sept. 15, 1936. C. E. MORLEY 2,054,578
STEAM HEATER FOR AUTOMOTIVE VEHICLES
Filed Oct. 5, 1934 3 Sheets-Sheet 1
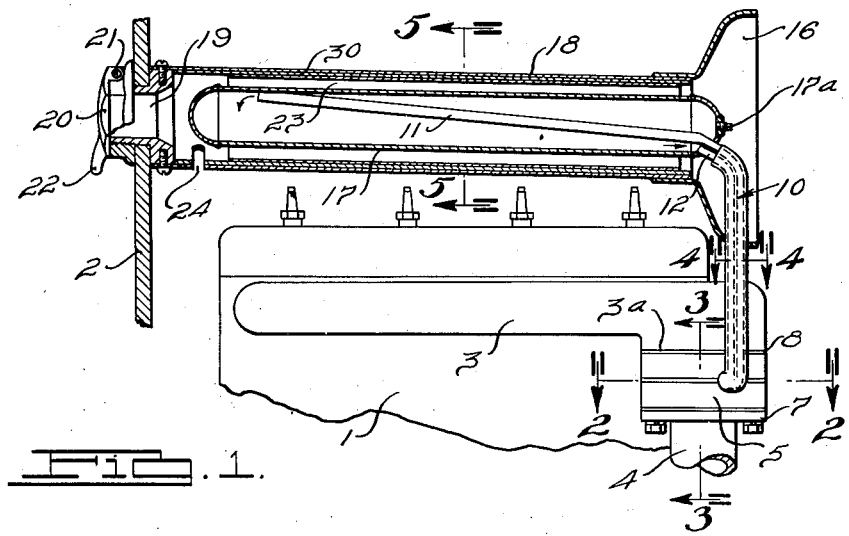
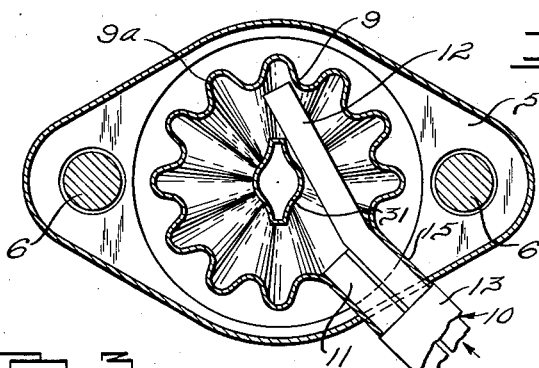
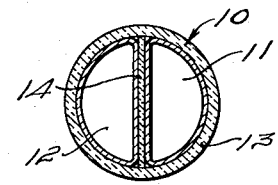
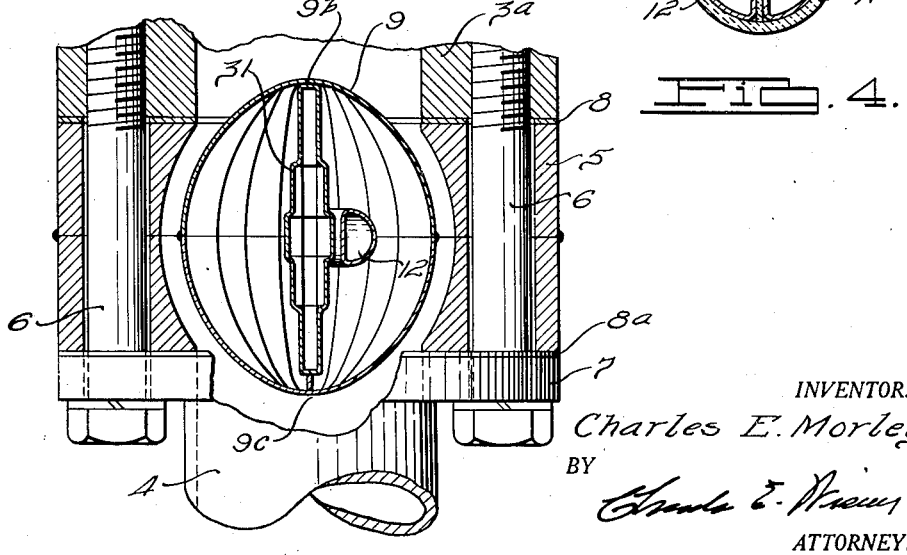
INVENTOR.
Charles E. Morley.
BY
ATTORNEY.

Sept. 15, 1936. C. E. MORLEY 2,054,578
STEAM HEATER FOR AUTOMOTIVE VEHICLES
Filed Oct. 5, 1934 3 Sheets-Sheet 2
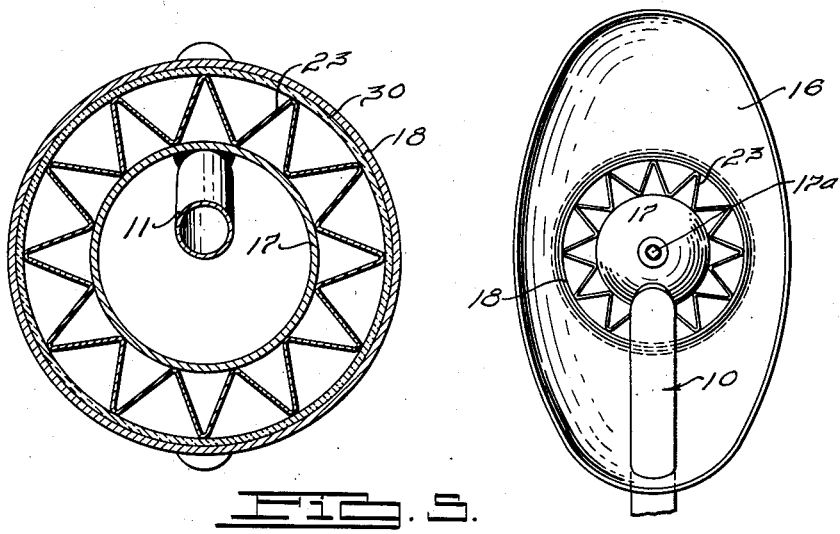
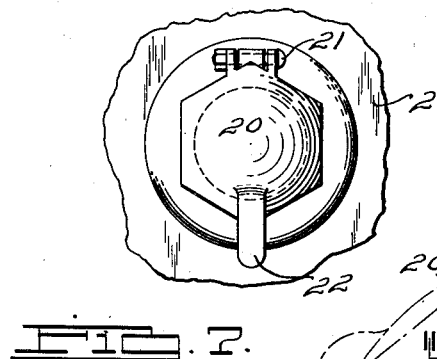
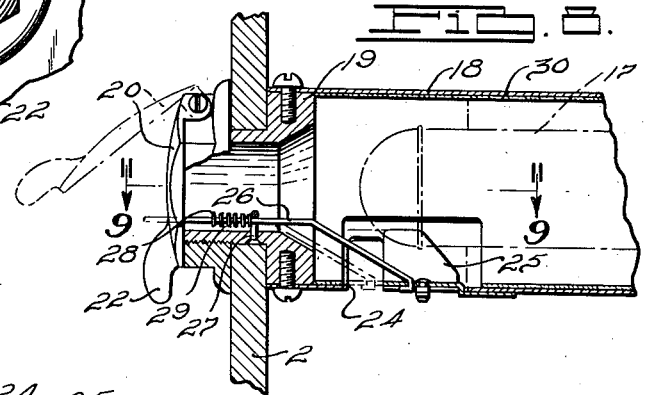
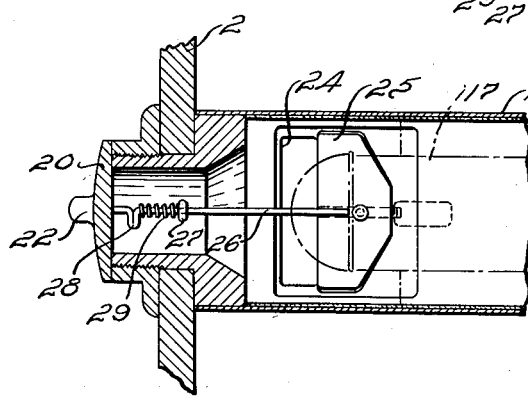
INVENTOR.
Charles E. Morley.
BY
ATTORNEY.

Sept. 15, 1936. C. E. MORLEY 2,054,578
STEAM HEATER FOR AUTOMOTIVE VEHICLES
Filed Oct. 5, 1934  3 Sheets-Sheet 3
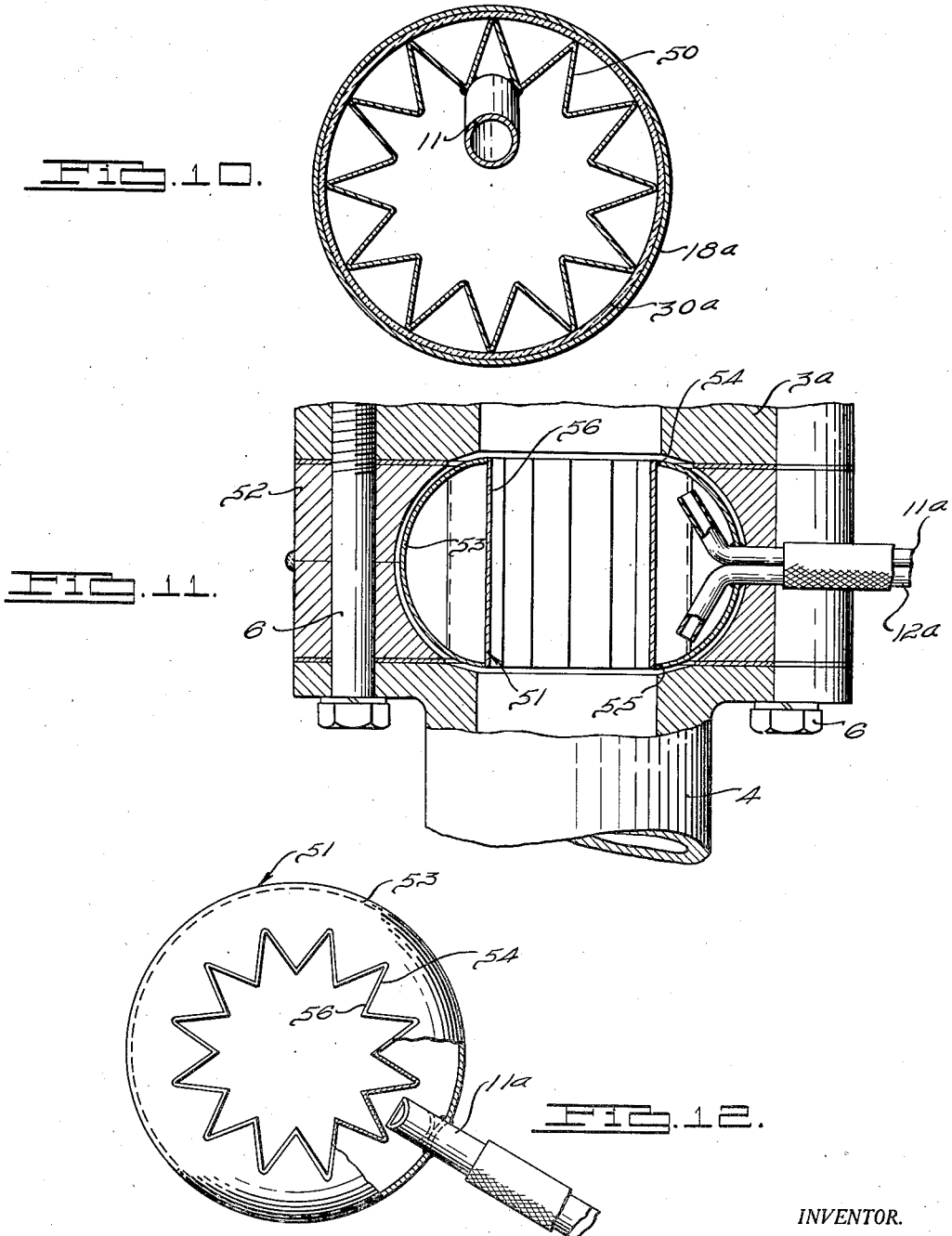
INVENTOR.
Charles E. Morley.
BY
ATTORNEY.

Patented Sept. 15, 1936

2,054,578

UNITED STATES PATENT OFFICE 2,054,578

STEAM HEATER FOR AUTOMOTIVE VEHICLES

Charles E. Morley, Detroit, Mich.

Application October 5, 1934, Serial No. 747,017

11 Claims. (Cl. 237—12.3)

This invention relates to steam heaters for automotive vehicles and is particularly adapted for use with such vehicles utilizing an internal combustion engine as a prime mover.

The object of the invention is to provide a device that may be readily attached to engines of this character without to any material degree dismantling the various parts thereof with which the heater is associated and includes a tubular element opening at the forward part of the engine compartment to receive air from the fan or air normally passing through the radiator when the vehicle is in use and the opposite end supported in the wall between the engine and the passenger or goods compartment of the vehicle. Within the tube is positioned a tubular steam chamber about which the air flows to the passenger or goods compartment, there being heat radiating fins provided on the steam chamber. Associated with such steam chamber is a boiler element of peculiar type insertible in the exhaust manifold of the engine, there being a tube extending from the boiler compartment and practically to the rear end of the steam chamber whereby steam is discharged into the steam chamber and a second conduit extending from the forward end of the steam chamber to return condensate to the boiler.

It is further an object and feature of the invention to provide a boiler containing water and a steam chamber in an assembled unit and in which a partial vacuum is produced prior to use and by heating the boiler, steam is discharged to the steam chamber by the exhaust gases from the engine, is there condensed and the condensed steam continuously flows to the boiler and maintains the system in continuous operation.

Other objects of the invention further are involved in various features of construction and arrangement of the several parts as hereinafter more fully described.

These various objects and features of the invention are hereinafter more fully described and claimed, and the preferred form of construction of a steam heater embodying my invention is shown in the accompanying drawings in which—

Fig. 1 is a side elevation partly in section showing a portion of an internal combustion engine, a boiler in the exhaust line and the steam chamber and tube for air flow discharging to the passenger compartment of a vehicle.

Fig. 2 is a section taken on line 2—2 of Fig. 1 showing a cross section of the boiler.

Fig. 3 is a section taken on line 3—3 of Fig. 1.

Fig. 4 is a section taken on line 4—4 of Fig. 1 showing the tubes between the boiler and steam chamber.

Fig. 5 is an enlarged section taken on line 5—5 of Fig. 1.

Fig. 6 is a front elevation of the air conduit and steam chamber therein taken from the right side of Fig. 1.

Fig. 7 is an elevation of the valve plate at the discharge end of the air tube.

Fig. 8 is a longitudinal section of the compartment end of the air tube showing a valve controlled opening to atmosphere.

Fig. 9 is a section taken on line 9—9 of Fig. 8.

Fig. 10 is a sectional view of the steam chamber in section showing an alternative form of construction.

Fig. 11 is a sectional view of an alternative form of boiler element.

Fig. 12 is a plan view thereof.

The assembled device is shown more particularly in Fig. 1 in which the engine is indicated at 1 and the wall between the engine and passenger compartments of an automotive vehicle is indicated at 2. The engine is provided with an exhaust manifold 3 and between this manifold 3 and the extension 4 thereof discharging to atmosphere is mounted a two-part casting 5 shown more clearly in Figs. 2 and 3. Bolts 6 are provided that extend through a flange 7 of the said extension 4 of the manifold and through the two-part boiler element 5 and into the similarly shaped end 3a of the manifold 3.

Ordinarily, the part 4 and flange 7 are bolted directly to this end 3a of the exhaust manifold and thus to assemble this heater in place requires simply the removal of the bolts holding the flange 7 to the part 3a introducing the casting 5 therebetween which is of the same shape in outline as the flange 7 and companion part 3a of the exhaust manifold. This may be done without any rearrangement of the engine parts or of the forming or shaping of the same to receive the casting containing the boiler element. As shown in Fig. 3, packing 8 and 8a are provided between the upper and the lower faces of the casting 5 and the respective attached portions of the exhaust conduit. Within the two-part casting 5, which is shaped to receive the same, is a boiler element 9 of ovoid form as shown in Fig. 3 and, as shown particularly in section in Fig. 2, the wall of this boiler element is corrugated or ribbed as indicated at 9a. The boiler element has its longest axis parallel with the axis of the exhaust conduit 4 and thus hot gases passing through the conduit strike the forward end 9b of the boiler element and pass about the periphery thereof and in the corrugations to the discharge end 9c. This shape of the boiler element prevents any dead gas space at either end thereof and the space between the boiler and the casting 5 within which it is located may be approximately equal to the cross sectional area of the conduit 4 to prevent restriction at this point to the flow of gases.

The two parts of the boiler casing formed of the two-part casting 5 may have a packing therebetween or may be welded together subsequent to introduction of the boiler element as may be desired. The two-part casting 5 is provided with an aperture to receive a tubular element 10 which, as shown in section in Fig. 4, is formed of two half cylindrical conduits 11 and 12 in an outer heat insulating casing 13 and insulation is provided between the flat walls of the two tubes as indicated at 14 particularly to prevent loss of heat from the tube containing steam to the tube containing water flowing from the steam chamber to the boiler. These tubes enter the boiler element which has a flanged aperture to receive the same and preferably a metal sleeve 15 is provided extending outwardly through the casting and to which the insulating cover 13 extends as shown in Fig. 2. Care is necessary to prevent any escape of water or steam from this boiler at the point of entrance of the tubes 11 and 12 except through the interior of the tubes. These tubes extend upwardly from the boiler and through an opening provided in the flared mouth 16 of the air tube and pass into a seamless steel tube 17 at one end thereof as shown in Fig. 1 and the joint at the entrance of these tubes is made secure against an escape of steam or water to atmosphere. The tube 11 is the steam tube and merely opens to the boiler at one end but extends into the steam chamber 17 to a point at the top and near the rear end and the tube 12 merely opens through the forward end of the steam chamber and extends into and preferably downwardly into the boiler element.

The tube 17 is preferably at a slight angle to the longitudinal so that the condensed steam will flow to the boiler through the tube 12. After this boiler and steam chamber elements are assembled and the water introduced into the the boiler, a partial vacuum is produced in the interior thereof and this construction forms a complete and finally assembled unit wherein no loss of water or vapor occurs and thus no depletion in the supply even if used for a considerable period of time but provision may be made, as by a plug 17a, for filling the boiler element if desired.

The steam chamber is mounted in an air tube 18 and the flared and oval shaped end 16, as shown in Fig. 6, directs air from the fan on passing through the radiator of the automobile into this tube 18. This tube at its rear end is secured to a casting 19 extending through an aperture provided in the compartment wall 2 which, inside the compartment, has secured thereon a hinged valve member 20. This valve may be of any desired character and is here shown merely as a plate having a hinge bolt 21 and a finger hold 22 by which it may be turned to an open position, the bolt being of sufficient tightness as to frictionally hold the member 20 in any of its possible positions. When the valve plate is open and the engine in operation, water in the boiler element is converted into steam and air flowing about the steam chamber discharges into the passenger compartment in heated condition.

To facilitate the transfer of heat to the air stream I preferably provide a thin sheet metal corrugated shell 23 shown more clearly in Fig. 5 which is preferably of copper and has contact with the steam chamber 17 and thus tends to transmit the heat to the air stream.

Preferably, adjacent the discharge end of the tube 18 is an aperture 24 in the lower side thereof, the purpose of which is to provide for egress of air when the valve plate 20 is closed or partially closed so that the heat is drawn off from the steam chamber constantly to provide for condensation of the steam therein; otherwise when the valve plate is closed and the engine in operation, the water which is small in quantity, namely, about one and one-half ounces, would all be evaporated and the steam chamber become excessively heated.

An alternative form of this discharge end of the air tube is indicated in Figs. 8 and 9 in which the aperture 24 is shown in association with a valve plate 25. To the valve plate is connected a rod 26 riding in a bracket 27 mounted in the casting 19 at the discharge end of the tube 18. A projection 28 is provided on the rod and a spring 29 is positioned between the projection and the bracket 27. The spring tends to automatically move the valve to the left of the position shown in Fig. 8 to close the aperture. The end of the rod is engageable by the valve plate 20 when in the closed position so that, when the operator closes the valve and air is prevented from passing into the passenger compartment, the aperture 24 is open to permit egress of air and, when the valve plate is open to the position shown in dotted lines in Fig. 8, the spring moves the valve plate to close the aperture. This arrangement provides for the maximum flow of air at all times into the compartment but the valve is not absolutely necessary as the aperture 24 may be constantly open as in the construction shown in Fig. 1 and will function automatically in providing for a continuous flow of air about the steam chamber when the valve plate 20 is closed.

Preferably the tube 18 is heat insulated to prevent loss of heat and this insulation is preferably upon the interior and, as is shown in Fig. 5, the corrugated member 23 is thus not in metallic contact with the outer metal shell 18 thereby preventing direct transfer of heat to the said shell. Inasmuch as water is the preferable element to use in the boiler which is more than half filled, some provision should be made against cracking the boiler element by freezing. For this purpose I fasten centrally of the boiler element a collapsible shell 31 formed of sheet metal and this shell will collapse as the water tends to freeze and thus relieve the outer walls of the boiler from pressure sufficient to rupture the same.

An alternative form of construction of the steam chamber is illustrated in sectional view in Fig. 10. In this form the internal tube 17 is dispensed with leaving the steam chamber itself formed by the corrugated wall 50 which can be made of sheet steel and welded to prevent leakage or rupture through pressure developed therein. The chamber 50 is within the outer shell 18a and the insulating material 30a is placed about the interior of the shell 18a to prevent metallic contact between the steel chamber 50 and the outer shell.

An alternative form of the boiler element is shown in Fig. 11 and this, instead of being of ball shape as is the form shown in Fig. 3, is generally a ring-like shape as indicated at 51 supported in a casting 52 which is preferably of two parts welded together as is the case with the two-part casting shown at 5 in Fig. 3. This ring-shaped member 51 is formed of a sheet of metal 53 rolled to arcuate form in cross section and the inner edges 54 and 55 thereof are welded to a collar member 56 which, as shown in Fig. 12, is notched. The edges 54 and 55 of the part 53 are also notched to engage therewith and the parts are welded at this point to provide a leak and pressure proof joint. In this structure the exhaust gases pass through the hollow collar 56 which, due to the V shaped corrugations, provide a large surface contact with the gases by which the heat is transmitted to the interior of the boiler and the water contained therein. This boiler is connected with the steam chamber in the same manner as shown in Fig. 1, the boiler being connected with the steam chamber by the tubes 11a and 12a. These tubes in the form shown in Fig. 11 will support the boiler element 51 in the casting 52 and preferably the area in cross section of the central opening of this ring-like element is approximately equal to the cross sectional area of the exhaust conduit with which it is connected. The ring-like boiler element 51 is spaced from the surrounding wall of the casting 52 to reduce or prevent transfer of heat to the casting.

The principal feature of the invention is in the provision of an assembled unit including a boiler and a steam chamber which, when assembled with the proper amount of water placed in the boiler, has pressure therein reduced to below atmosphere preparatory to its use in the heating system. By this arrangement a long continued operation of the heater is secured and also an inexpensive structure is provided by the arrangement described, all the parts being principally of tubing and sheet metal with the exception of the two-part casing 5 for the boiler element introduced in the exhaust line and these need only be cast parts of an inexpensive character.

It is believed evident from the foregoing description that the various objects and features of the invention are attained by the construction described and that various structural departures may be made from that shown in the drawings without departing from the spirit and scope of the invention as set forth in the appended claims.

Having thus briefly described my invention, its utility and mode of operation, what I claim and desire to secure by Letters Patent of the United States is—

1. A heating device for automotive vehicles having a body compartment and a compartment for an engine and cooling fan, comprising a boiler subject to influence of heat of the burned gases, a steam chamber, an air conduit opening at one end to the body compartment and open at the opposite end to the engine compartment adjacent the cooling fan, said steam chamber comprising a tubular element positioned within and spaced from the walls of the air conduit, the steam chamber having a series of heat radiating elements about which the air stream passes, a conduit for steam opening to the boiler element and extending into and discharging adjacent the compartment end of the steam chamber, a conduit for condensed steam opening to the forward end of the steam chamber and discharging to the boiler element, the said boiler and last named conduits and steam chamber being sealed to atmosphere subsequent to introduction of a limited amount of vapor producing medium, the complete system being under partial vacuum, a valve for controlling the volume of flow of air to the body compartment through the air conduit, said air conduit having an opening to atmosphere adjacent the rear end of the steam chamber whereby, when said valve is closed, air may flow through the air conduit to maintain a continuous condensation of steam discharged thereinto from the boiler when the engine is in operation.

2. A heating device for use in conjunction with automotive vehicles having a body compartment and a compartment for an internal combustion engine and cooling fan, comprising a boiler element subject to influence of the heat of the burned gases of the engine, an air conduit above the boiler element extending longitudinally of the engine compartment and having an open forward end through which air may be discharged by the fan when the engine is in operation, the rear end of said conduit opening to the body compartment, a valve for controlling the said opening, a steam chamber of elongated form extending longitudinally of the air conduit in spaced relation with the walls thereof about which the air stream flows, a conduit for steam opening to the boiler element and extending into and discharging adjacent the compartment end of the steam chamber, a conduit for condensed steam opening to the forward end of the steam chamber and discharging to the boiler element, the forward end of the steam chamber being lower than the rear end to cause ready flow of condensate to the condensed steam conduit, said air conduit having an opening to atmosphere adjacent the end thereof opening to the body compartment to provide for a flow of air about the steam chamber when the valve is closed whereby the steam is condensed through influence of the air stream in any position of the control valve for the air conduit.

3. A heating device for use in conjunction with automotive vehicles having a body compartment and a compartment for an internal combustion engine having a cooling fan and an exhaust conduit, a boiler element, a housing for the boiler element positioned between parts of the exhaust conduit to thereby subject the boiler element to the heat of the exhaust gases, an air conduit extending longitudinally of the engine compartment and having one end opening adjacent said fan, the opposite end opening to the body compartment, a valve for controlling the said body compartment opening, a steam chamber of elongated form positioned within the air conduit, a steam conduit, and a condensed vapor conduit extending between the boiler and the steam chamber, the condensed steam conduit opening to the forward end of the steam chamber and the steam chamber lying at an angle to the horizontal to cause flow of condensate to the condensed steam conduit, the said air conduit having an opening to atmosphere adjacent the end opening to the body compartment.

4. A heating device for use in conjunction with automotive vehicles having a body compartment and a compartment for an internal combustion engine having a cooling fan and an exhaust conduit, a boiler element, a housing for the boiler element positioned between parts of the exhaust conduit to thereby subject the boiler element to the heat of the exhaust gases, an air conduit extending longitudinally of the engine compartment and having one end opening adjacent said fan, the opposite end opening to the body compartment, a valve for controlling the said body compartment opening, a steam chamber of elongated form positioned within the air conduit, a steam conduit, a condensed vapor conduit extending between the boiler and the steam chamber, the condensed steam conduit opening to the forward end of the steam chamber and the steam chamber lying at an angle to the horizontal to cause flow of condensate to the condensed steam conduit, the said air conduit having an opening to atmosphere adjacent the end opening to the body compartment, and a valve element for closing the said last named opening of the air conduit, and means whereby opening of the valve controlling air flow to the body compartment closes the valve for the opening to atmosphere, the parts being so arranged that the closing of the valve to the body compartment moves the other valve to permit flow of air from the air conduit to atmosphere.

5. A heating device for use in conjunction with automotive vehicles having a body compartment and a compartment for an internal combustion engine having a cooling fan and an exhaust conduit, a boiler element, a housing for the boiler element positioned between parts of the exhaust conduit to thereby subject the boiler element to the heat of the exhaust gases, an air conduit extending longitudinally of the engine compartment and having one end opening adjacent said fan, the opposite end opening to the body compartment, a valve for controlling the said body compartment opening, a steam chamber of elongated form positioned within the air conduit, a steam conduit, a condensed vapor conduit extending between the boiler and the steam chamber, the condensed steam conduit opening to the forward end of the steam chamber and the steam chamber lying at an angle to the horizontal to cause flow of condensate to the condensed steam conduit, the said air conduit having an opening to atmosphere adjacent the end opening to the body compartment, and a valve element for closing the said last named opening of the air conduit, the said last named valve and the valve controlling the opening to the body compartment being so arranged that the opening of the valve to the body compartment closes the valve for the opening to atmosphere and the closing of the valve to the body compartment opens the valve for the opening to atmosphere.

6. A steam heating device for automotive vehicles having a body compartment and a compartment for an internal combustion engine having an exhaust conduit and a cooling fan, a boiler element, a housing therefor positioned between parts of the exhaust conduit in a manner to subject the boiler element to the heat of the exhaust gases, an air conduit extending longitudinally of the engine compartment having an opening adjacent the fan whereby air is forced through the conduit, said conduit having an opening to the body compartment and an opening adjacent thereto leading to atmosphere, a steam chamber positioned in the air conduit whereby the steam is condensed in the chamber by the air flow, conduits between the boiler element and the steam chamber for discharging steam into the chamber and returning the condensate to the boiler, the said boiler, steam chamber and conduits therebetween being sealed to atmosphere and, subsequent to assembly, having the air partially exhausted, a valve for the opening to the body compartment, and a valve for opening or closing the air conduit to atmosphere, the said valve elements being correlated that the opening of the valve element to the body compartment closes the opening of the air conduit to atmosphere and vice versa.

7. In a steam heating device for automotive vehicles having a body compartment and a compartment for an internal combustion engine having an exhaust conduit and a cooling fan, a boiler element positioned in the exhaust conduit, a steam chamber above the boiler, conduits for steam and for condensed vapor extending between the boiler and the steam chamber, the unit consisting of the said conduits, boiler element and steam chamber being under partial vacuum and the boiler containing a vapor producing liquid, an air conduit within which the steam chamber is positioned, said air conduit having an open end adjacent the cooling fan, and an opening at the opposite end discharging to the body compartment, a valve controlling said opening, said steam chamber being in spaced relation with the walls of the air conduit providing a passageway for air thereabout, ribs extending longitudinally of the steam chamber and into the air stream providing for ready transfer of heat from the steam chamber to the air stream, a heat insulating shell within the air conduit preventing contact of the ribs with the air conduit, and means for providing for a continuous flow of air through the air conduit when the valve in the body compartment is closed.

8. In a steam heating system for automotive vehicles having a body compartment and a compartment for an internal combustion engine having an exhaust conduit and a cooling fan, a boiler element, a housing therefor positioned between parts of the exhaust conduit in a manner to subject the boiler to the heat of the exhaust gases, an air conduit open at the forward end adjacent the fan and open at the rear end to the body compartment, a valve for opening or closing the opening to the body compartment, a steam chamber in the air conduit, conduits extending between the steam chamber and the boiler element for a flow of steam to the steam chamber and condensed vapor therein to the boiler, means for causing a flow of air about the steam chamber to discharge to the body compartment, the boiler element, steam chamber and conduits therebetween being sealed to atmosphere under partial vacuum, and means for providing for a flow of air about the steam chamber when the air conduit is closed to the body compartment.

9. In a steam heating device for automotive vehicles having a body compartment, a compartment for an internal combustion engine having an exhaust conduit and a cooling fan, an air conduit positioned with an open end thereof adjacent the fan and discharging to the body compartment, a steam chamber in spaced relation with the air conduit providing a passageway therebetween for exhaust gases, said steam chamber being provided with a series of heat radiating ribs providing for a rapid transfer of heat from the steam chamber to the air stream, a boiler element, a housing therefor fitting in and providing a part of the exhaust conduit, separate conduits for steam to pass from the boiler to the steam chamber and for condensate to pass from the steam chamber to the boiler, said conduits lying in parallel relation and each being half semi-spherical in form in cross section, insulation extending between the opposed flat faces of the two conduits, and insulation surrounding the said conduits, said conduits extending through the housing to the boiler element and supporting the boiler element therewithin, said conduits at the opposite end extending through an aperture provided therefor in the air conduits thereby supporting the steam chamber from longitudinal displacement, said boiler having a ribbed surface contacted with the exhaust gases providing for rapid heat transfer to the vapor producing a medium in the boiler.

10. In a steam heating device for internal combustion engine driven automobiles having a body compartment, a compartment for the engine, its exhaust conduit and a cooling fan, an air conduit through which air is discharged by the fan to the body compartment, a steam chamber within the air conduit, a boiler element subject to influence of the heated gases from the engine, conduits between the boiler and the steam chamber to provide for a flow of steam to the steam chamber and condensed steam therefrom to the boiler, said air conduit having an opening to atmosphere, and a joint control means for the discharge end of the air conduit to the body compartment and said opening whereby, as the discharge end of the air conduit is opened to flow of air, the said opening in the air conduit is closed to flow of air and vice versa.

11. In a steam heating device for an internal combustion engine driven automobile having a body compartment and a compartment for the engine, its exhaust conduit and a cooling fan, an air conduit opening at one end to receive air from the fan and opening at its opposite end to the body compartment, a steam chamber within the air conduit and about which the air stream flows whereby the steam is condensed, means for supplying steam to the said steam chamber and returning the condensed steam to the supply source, and means for causing the discharge of the air passing into the air conduit through the opening to the body compartment or to atmosphere exteriorly of the compartment.

CHARLES E. MORLEY.